Figure 1:
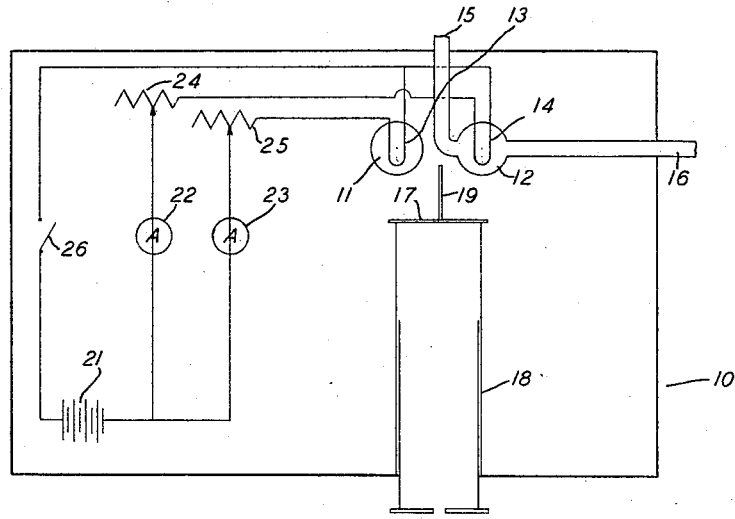

Dec. 6, 1932.  A. N. ERICKSON  1,889,890
METHOD AND APPARATUS FOR DETECTING THE PRESENCE
OF INFLAMMABLE CONSTITUENTS IN GAS MIXTURES
Filed July 8, 1927

INVENTOR:
Albert N. Erickson,
BY
Byrns Townsend & Brickenstein,
ATTORNEYS.

Patented Dec. 6, 1932

1,889,890

UNITED STATES PATENT OFFICE

ALBERT N. ERICKSON, OF ELMHURST, NEW YORK, ASSIGNOR TO UNION CARBIDE COMPANY, A CORPORATION OF VIRGINIA

METHOD AND APPARATUS FOR DETECTING THE PRESENCE OF INFLAMMABLE CONSTITUENTS IN GAS MIXTURES

Application filed July 8, 1927. Serial No. 204,367.

My invention relates to improvements in processes and apparatus for determining the content of combustible gases in gaseous mixtures and is especially adapted for use in coal or other mines, although it is equally available for detecting the presence of inflammable gases elsewhere.

The combustible gases when mixed with air or other gases containing oxygen and brought into contact with a heated surface will begin to oxidize at a temperature below the ignition point of the mixture. Furthermore, when in contact with a heated surface oxidation of the inflammable or combustible gases will occur even though the latter is present in a proportion too small to support free combustion. Oxidation of the inflammable gas below its ignition temperature is accompanied by the generation of heat, part of which will act to raise the temperature of the surface inducing the oxidation. If the proportion of combustible gas in the mixture be great enough, sufficient heat will be generated to maintain the temperature of the surface, but in more dilute mixtures extraneous heat will be required. In either case the surface will assume a higher temperature in an atmosphere contaning combustible gas. If the heated surface is incandescent at the temperature at which oxidation takes place, it is possible to estimate its temperature by optical methods. Since the temperature of such a surface increases with an increase in the amount of combustible gas present it is possible to determine this amount by measuring the intensity of light emitted from the surface.

An object of my invention is to provide a method of determining the combustible content of oxygen-containing gaseous mixtures. Another object of my invention is the provision of suitable forms of apparatus for carrying out my method. Various embodiments of such apparatus are described in the following specification having reference to the accompanying drawing in which Figure 1 is a diagrammatic representation of one embodiment of my invention; and Figure 2 is a diagrammatic representation of another embodiment thereof.

The measurement of the light emitted by the heated surface is best accomplished by comparison with another light. Direct estimations of the relative brightness of two sources of light are difficult and it is desirable to provide means for projecting the light from the two sources onto adjacent surfaces and for making the illuminated areas of equal brightness as by changing the brightness of the comparison source or by varying the distance between one of the sources and the surface which it illuminates.

Figure 2:
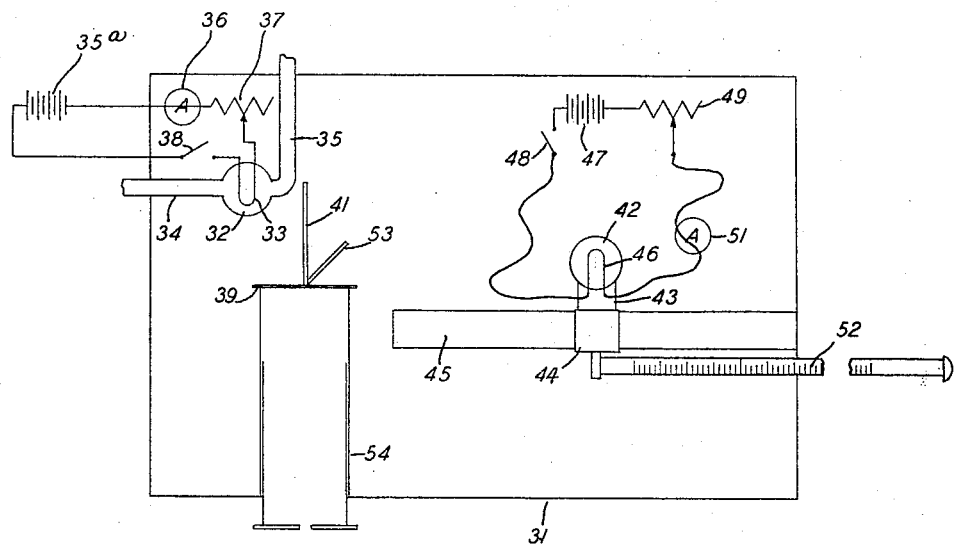

In Figure 1, I illustrate a device for carrying out my method in which the intensity of the comparison source is varied, the distances between the two sources and the surfaces respectively illuminated by them being constant and preferably equal. In this device a case 10 is provided, the bottom of this case serving as a base for mounting the various parts of the apparatus. In the case are mounted a lamp 11 containing filament 13 and a chamber 12 having a filament 14 of any suitable material therein. I have found platinum suitable for such filament because of its high melting point and freedom from oxidation but I do not limit myself to the use of filaments of such material. Chamber 12 is provided with tubes 15 and 16. One of these tubes is preferably connected to a pump, as a bulb pump, which serves to force the atmosphere to be tested through chamber 12 and in contact with the filament 14 therein, and may be extended, as by a flexible tube to permit examination of the atmosphere in localities where the instrument as a whole cannot be taken.

Chamber 12 is made of transparent material so that the light emitted by the filament 14 may be observed. Means for comparing the light from the filament 14 with that from lamp 11 is provided. This may take the form of a translucent screen 17 affixed to the end of a sight-tube 18 with an opaque screen 19 arranged to cause half of screen 17 to be illuminated by each source.

For the purpose of heating the filaments I provide a battery 21 which may be located within or without the case. Separate circuits are provided for the respective filaments, these circuits including electrical measuring instruments 22 and 23 adapted to be actuated by very small currents such as galvanometers, milliammeters and/or millivoltmeters. Each instrument and its corresponding filament are in series or parallel, depending on the characteristics of the instruments. Each circuit is also provided with a variable resistance 24 or 25. A switch 26 is also provided which may be, as shown, in the common part of the circuit or there may be a switch in each branch. While I have shown a common battery for the two filaments I may of course provide a separate battery for each filament. The filament 14 should be heated to such a temperature that oxidation will proceed without depending on any catalytic action of the filament as such catalytic properties are impaired in the presence of certain substances. I have found a temperature of 1000° C., a suitable one. The resistances 24 and 25 make it possible to adjust the currents flowing through these filaments so that the same amount of light is emitted from each. I have found a storage battery of the type commonly used for miner's cap lights well adapted for use with my device.

The operation of the device described above is as follows:

The switch 26 being closed, the resistance 24 is adjusted so that the normal current is flowing through the filament 14. The resistance 25 is then adjusted so that the screen 17 is evenly illuminated. This calibration is of course carried out in a normal atmosphere. A sample of the atmosphere to be tested is forced through the chamber 12. If there be combustible gas present the temperature of the filament 14 will be increased and this increase in temperature can be detected by an increased illumination of the portion of the screen corresponding to this filament. The resistance 24 is then adjusted to bring the illuminated areas to equal brightness. The initial and final readings of the measuring instrument 22 will serve as a measure of the amount of combustible gas present. I may graduate the instruments directly in terms of the proportion of combustible gas present or graduate them in electrical units and obtain the composition of the atmosphere from a table or chart previously prepared. It is of course evident that instead of adjusting the resistance 24 I may adjust the resistance 25 in which case the instrument 23 is used in the determination.

Instead of adjusting the intensity of light from the filament I may adjust the distances between the two sources of light and the screen upon which the light is projected. This permits of a more accurate reading as the observed change in illumination in this case is less rapid than is effected by varying the current through the filaments. In Fig. 2 I show a device constructed upon this principle which comprises a case 31 having therein a chamber 32 provided with a filament 33. Tubes 34 and 35 are provided for passing the atmosphere to be tested through the chamber. A battery 35a is provided for heating the filament and in circuit with the battery and filament I provide a measuring instrument 36, a variable resistance 37, and a switch 38. A translucent screen 39 receives light from the filament 33 and an opaque screen 41 restricts this light to half the screen. A comparison light 42 is mounted on the socket 43, this socket being in turn mounted in a slider 44 which slides on a guide 45. Lamp 42 contains a filament 46 which is in circuit with a battery 47, a switch 48, a variable resistance 49 and a measuring instrument 51. This lamp may be of any suitable construction and is preferably such a light as is used as a standard in ordinary photometric work. The slider 44 is moved along the guide 45 by means of a rod 52. A mirror 53 is provided for reflecting the light emitted from the filament 46 onto the half of the screen 39 which is not illuminated by the light from the filament 33. A sight-tube 54 is provided for observing the screen. If I desire I may provide lenses in this sight-tube. It will be evident that variations in the intensity of the light emitted from the filament 33 due to variations in the atmosphere being tested will cause a change in the illumination of one half the screen 39. To bring the other half of the same illumination I move the lamp 42 closer to or farther from the screen. The distance of the light 42 from the screen serves as a measure of the brightness of the filament 33. Various means of measuring this distance may be employed, such as graduating the rod 52.

The operation of this modification of my invention is as follows:

The switches 38 and 48 being closed, the resistance 49 is adjusted to bring the filament 46 to standard temperature, the lamp 42 being at normal distance from the mirror 53. Resistance 37 is then adjusted so that the illuminated areas on the screen match. The atmosphere to be tested is then passed through the chamber 32. If there be any combustible constituents in the sample it will be manifest by an increase in the illuminated area corresponding to filament 33. The rod 52 is then manipulated until the illuminated areas match, when the distance of the lamp 42 from the mirror 53 is read by means of the graduations on the rod 52. These graduations may be made directly in percentages of combustible constituent present or may be such that reference to a table or curve is required.

I claim:

1. In an apparatus for detecting the presence of combustible gases in an oxygen-containing gas mixture, the combination of a chamber having a transparent portion, means for forcing a sample of the mixture to be tested through said chamber, a filament in said chamber, means for supplying current to said filament, a screen disposed to receive light emitted by said filament, means for projecting light on a screen adjacent that first mentioned and means for varying the intensity of illumination on said last mentioned screen.

2. In an apparatus for detecting the presence of combustible gases in an oxygen-containing gas mixture, the combination of a chamber having a transparent portion, means for forcing a sample of the gas to be tested through said chamber, a light-emitting filament in said chamber, a second source of light external to said chamber, adjacent screens receiving light from said filament and from said second source of light, and means for varying the intensity of the light transmitted from said second source of illumination to its screen.

3. The method of estimating a combustible constituent in an oxygen containing gas mixture which comprises exposing a resistor to contact with a normal atmosphere, passing a sufficient current of electricity through said resistor to raise the temperature thereof to a point such that the resistor is incandescent, directing the light from said resistor upon a comparison area, directing the light from a comparison source upon a second comparison area adjacent the first named comparison area, bringing the gas mixture to be tested into contact with said resistor while maintaining the current substantially constant, allowing at least a part of the heat of oxidation to be absorbed in said resistor and adjusting the light from the comparison source whereby the radiation emitted by said resistor may be measured and the content of combustible constituents may be estimated.

In testimony whereof, I affix my signature.

ALBERT N. ERICKSON.